(12) United States Patent
Lofstrom et al.

(10) Patent No.: US 11,331,713 B2
(45) Date of Patent: May 17, 2022

(54) BOND FIXTURE FOR COMPOSITE SPLICE FAIRING ASSEMBLY

(71) Applicant: Sikorsky Aircraft Corporation, Stratford, CT (US)

(72) Inventors: Sven Roy Lofstrom, Irving, TX (US); David Littlejohn, Haslet, TX (US); Scott Oren Smith, Bedford, TX (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 94 days.

(21) Appl. No.: 16/567,778

(22) Filed: Sep. 11, 2019

(65) Prior Publication Data
US 2020/0001347 A1    Jan. 2, 2020

Related U.S. Application Data

(62) Division of application No. 15/232,256, filed on Aug. 9, 2016, now Pat. No. 10,456,823.

(51) Int. Cl.
| | |
|---|---|
| *B21D 53/78* | (2006.01) |
| *B29C 65/02* | (2006.01) |
| *B64F 5/40* | (2017.01) |
| *B64F 5/10* | (2017.01) |
| *B64C 27/473* | (2006.01) |
| *B29C 73/24* | (2006.01) |

(52) U.S. Cl.
CPC .............. *B21D 53/78* (2013.01); *B29C 65/02* (2013.01); *B64C 27/473* (2013.01); *B64F 5/10* (2017.01); *B64F 5/40* (2017.01); *B29C 73/24* (2013.01); *B64C 2027/4736* (2013.01)

(58) Field of Classification Search
CPC ... B21D 53/78; B64F 5/40; B64F 5/10; B64C 27/473; B64C 2027/4736; B29C 65/02; B29C 73/24
See application file for complete search history.

(56) References Cited

U.S. PATENT DOCUMENTS

| | | | |
|---|---|---|---|
| 3,585,356 A | 6/1971 | Hall | |
| 3,607,545 A | 9/1971 | Parsons et al. | |
| 4,855,011 A | 8/1989 | Legge et al. | |
| 5,346,367 A | 9/1994 | Doolin et al. | |
| 5,862,576 A | 1/1999 | Leahy et al. | |
| 5,908,522 A | 6/1999 | Lofstrom et al. | |
| RE37,774 E | 7/2002 | Leahy et al. | |
| 8,409,389 B2 | 4/2013 | Jones | |
| 8,552,347 B2 * | 10/2013 | Boschet | B29C 66/80 219/603 |
| 9,144,944 B1 | 9/2015 | White | |
| 2014/0115894 A1 | 5/2014 | Gamboa | |
| 2014/0250675 A1 | 9/2014 | Sherrill et al. | |
| 2018/0043418 A1 | 2/2018 | Lofstrom et al. | |

OTHER PUBLICATIONS

U.S. Non-Final Office Action; U.S. Appl. No. 15/232,256; Application Filing Date: Aug. 9, 2016; dated Feb. 25, 2019; 15 pages.

* cited by examiner

*Primary Examiner* — Moshe Wilensky
(74) *Attorney, Agent, or Firm* — Foley & Lardner LLP

(57) ABSTRACT

A bond fixture includes a frame that defines a chamber for receiving a component. At least one bladder assembly is mounted to the frame and extends into the chamber to apply a pressure to an adjacent surface of the component. A caul assembly is positionable about the component and receivable within the chamber. The caul assembly heats a localized portion of the component.

10 Claims, 7 Drawing Sheets

BOND FIXTURE FOR COMPOSITE SPLICE FAIRING ASSEMBLY

CROSS-REFERENCE TO RELATED APPLICATIONS

The present invention claims priority to U.S. application Ser. No. 15/232,256, filed Aug. 9, 2016, the contents of which are incorporated herein by reference in their entirety.

BACKGROUND OF THE INVENTION

Exemplary embodiments of the invention relate to a rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a bond fixture includes a frame that defines a chamber for receiving a component. At least one bladder assembly is mounted to the frame and extends into the chamber to apply a pressure to an adjacent surface of the component. A caul assembly is positionable about the component and receivable within the chamber. The caul assembly heats a localized portion of the component.

In addition to one or more of the features described above, or as an alternative, in further embodiments the at least one bladder assembly includes a bladder retainer and a bladder.

In addition to one or more of the features described above, or as an alternative, in further embodiments the at least one bladder assembly includes a first bladder assembly configured to apply a pressure to a first surface of the component and a second bladder assembly configured to apply a pressure to a second surface of the component.

In addition to one or more of the features described above, or as an alternative, in further embodiments the first bladder assembly and the second bladder assembly are fluidly coupled.

In addition to one or more of the features described above, or as an alternative, in further embodiments a pressure is equalized between the first bladder assembly and the second bladder assembly.

In addition to one or more of the features described above, or as an alternative, in further embodiments the caul assembly includes a heater blanket.

In addition to one or more of the features described above, or as an alternative, in further embodiments the caul assembly further includes an inner caul, and outer caul, the heater blanket being positioned between the inner caul and the outer caul.

In addition to one or more of the features described above, or as an alternative, in further embodiments heat applied by the heater blanket to the component is uniform across the component.

In addition to one or more of the features described above, or as an alternative, in further embodiments heat applied by the heater blanket to the component varies across the component.

In addition to one or more of the features described above, or as an alternative, in further embodiments the bond fixture includes at least one strap for securing the bond fixture to the component.

In addition to one or more of the features described above, or as an alternative, in further embodiments comprising a trailing edge guard mounted to the component opposite the frame.

In addition to one or more of the features described above, or as an alternative, in further embodiments the frame and the trailing edge guard cooperate to affix to the component.

According to another embodiment, a method of bonding a sheath splice fairing to a rotor blade includes installing the sheath splice fairing about the rotor blade, mounting a bond fixture to the rotor blade about the sheath splice fairing and applying localized and constant heat and pressure to the sheath splice fairing via the bond fixture.

In addition to one or more of the features described above, or as an alternative, in further embodiments installing a caul assembly about the sheath splice fairing, the caul assembly being received within the bond fixture.

In addition to one or more of the features described above, or as an alternative, in further embodiments mounting the bond fixture to the rotor blade includes tightening at least one strap about the rotor blade.

In addition to one or more of the features described above, or as an alternative, in further embodiments mounting the bond fixture to the rotor blade includes coupling the bond fixture to a trailing edge guard mounted to the rotor blade, opposite the bond fixture.

In addition to one or more of the features described above, or as an alternative, in further embodiments comprising connecting a power source to the bond fixture to apply heat to the sheath splice fairing.

In addition to one or more of the features described above, or as an alternative, in further embodiments comprising connecting an air supply to the bond fixture to apply pressure to the sheath splice fairing.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
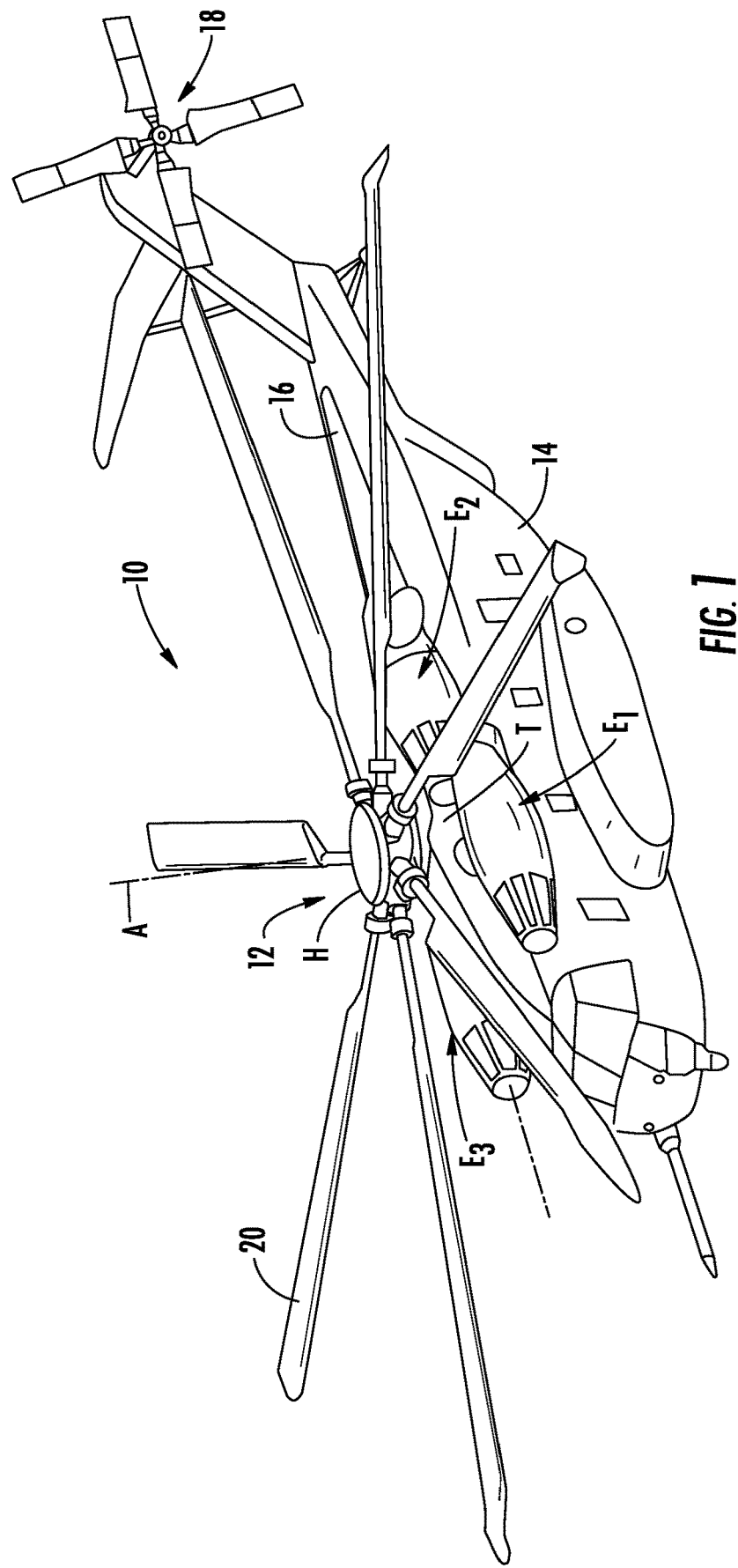
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
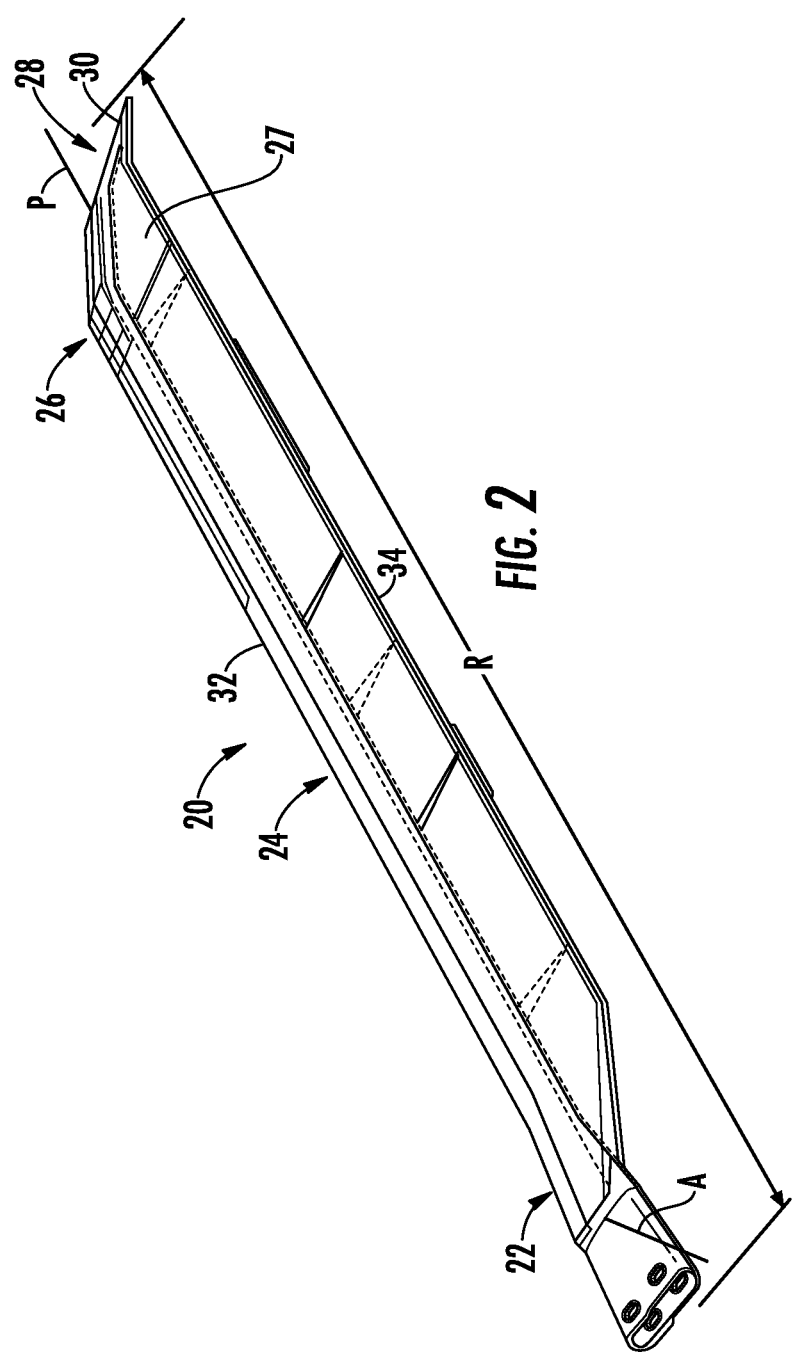
FIG. 2 is a perspective view of an example of a rotor blade of a rotary wing aircraft.

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form (not shown); however, a tip section having any angled or non-angled form such as cathedral, gull, bent, and other non-straight forms are also contemplated herein.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length Cm.

Figure 3:
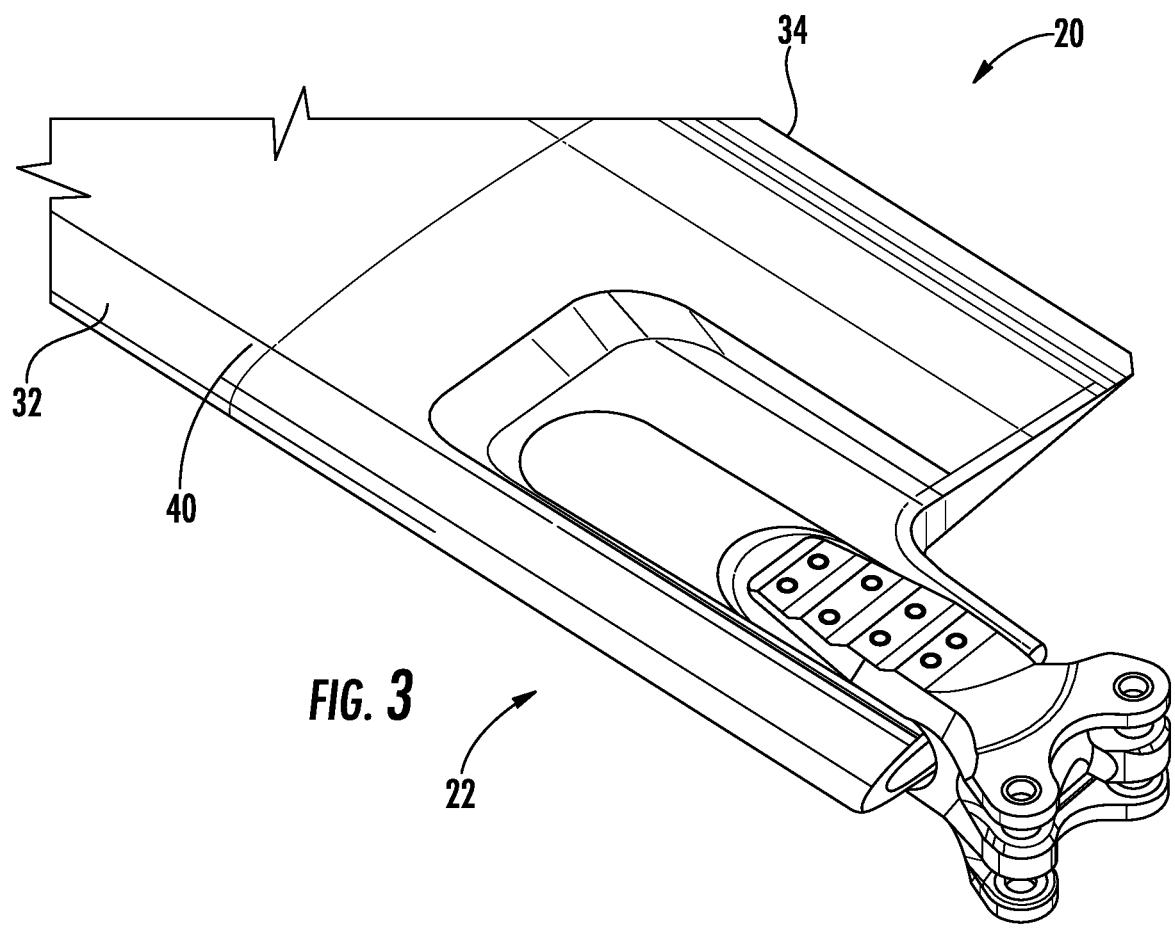
FIG. 3 is a perspective view of the root end of the rotor blade of FIG. 2.

Referring now to FIG. 3, during fabrication of a rotor blade, multiple plies are overlapped to form a splice joint in the leading edge 32. The splice joint is generally a weak region that is subject to delamination. To strengthen the splice joint, a sheath splice fairing 40 is bonded to the blade 20 overlaying the splice joint to ensure proper lamination of the adjacent plies forming the leading edge 32 and to provide structural reinforcement.

Figure 4:
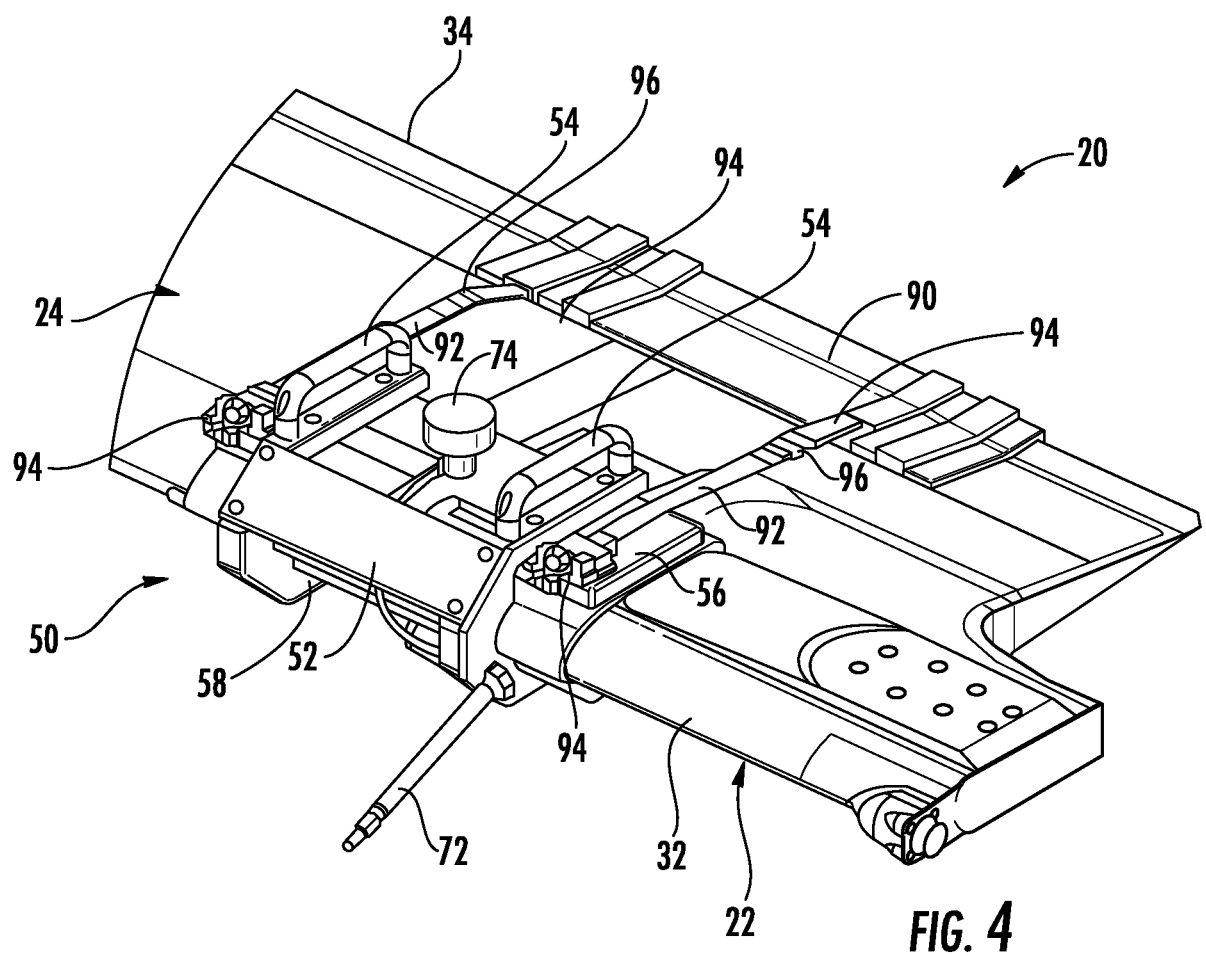
FIG. 4 is a perspective view of a rotor blade having a bond fixture mounted thereto according to an embodiment.
Figure 5:
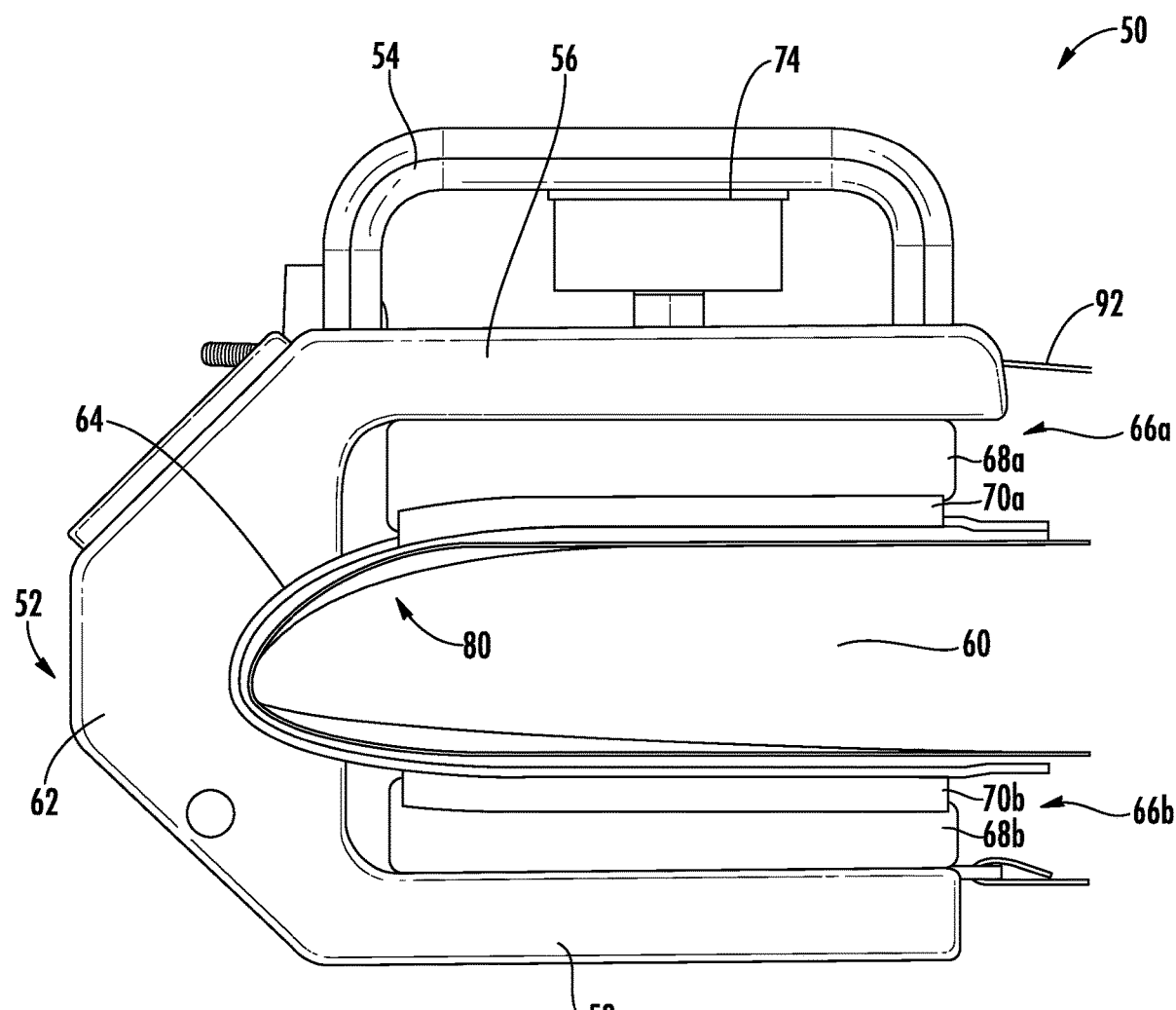
FIG. 5 is a cross-sectional view of the bond fixture according to an embodiment.

Referring now to FIGS. 4-5, a bond fixture 50 configured to provide the necessary bonding pressure and heat to bond the sheath splice fairing 40 to the remainder of the rotor blade 20 is illustrated. The bonding fixture 50 includes a frame 52 configured to surround at least a portion of a rotor blade 20. In an embodiment, one or more handles 54 are mounted to a portion of the frame 52, such as an exterior surface thereof for example, to aid in installation and removal of the bond fixture 50. As shown, the frame 52 is generally U or C-shaped and includes a first arm 56 and second arm 58 coupled at a first end thereof. The first and second arm 56, 58, may but need not be substantially identical. The first and second arms 56, 58 are arranged parallel to and opposite one another in a generally aligned manner such that the first and second arms 56, 58 are separated by a distance. However, it should be understood that a frame 52 having another configuration is also within the scope of the disclosure.

The frame 52 defines a chamber 60 within which the rotor blade 20 is positionable. In an embodiment, the portion 62 of the frame 52 coupling the first and second arms 56, 58 has an inlet or cavity 64 formed therein generally complementary to the leading edge 32 of a rotor blade 20. As a result, when the bond fixture 50 is mounted to a rotor blade 20, the leading edge 32 is disposed within the cavity 64, as shown in FIG. 5.

Extending inwardly into the chamber 60 from the first and second arms 56, 58 of the frame 52 are a first bladder assembly 66a and a second bladder assembly 66b, respectively. Each of the first and second bladder assemblies 66a, 66b includes a bladder retainer 68a, 68b coupled to a bladder 70a, 70b. The bladders 70a, 70b may be formed from any suitable material that does not damage the surface rotor blade 20 when applying pressure thereto. In an embodiment, the bladders 70a, 70b are formed from a flexible material configured to conform to the surface of the rotor blade 20. The bladder 70a of the first bladder assembly 66a is configured to apply pressure to a first, upper surface of the rotor blade 20 and sheath splice fairing 40, and the bladder 70b of the second bladder assembly 66b is configured to apply pressure to a second, lower surface of the rotor blade 20 and sheath splice fairing 40.

An inlet pipe 72 extending from the frame 52 is operably coupled to an air supply to pressurize at least one of the bladder assemblies 66a, 66b. In an embodiment, the interior of the frame 52 is generally hollow and is operably coupled to an air source via the inlet pipe 72 such that the first bladder assembly 66a and the second bladder assembly 66b are arranged in fluid communication and the pressure is equalized there between. However, embodiments where the pressure between the first and second bladder assemblies 66a, 66b is uneven, or embodiments where the bladder assemblies 66a, 66b are operable independent of one another are also contemplated herein.

A control knob 74 associated with the air source and/or a controller of the air source is mounted to a portion of the frame 52. In an embodiment, the control knob 74 may be a pressure gage for monitoring the pressure of the first and second bladder assemblies 66a, 66b. Alternatively, or in addition, the control knob 74 may be a pressure regulator rotatable about an axis to increase or decrease the pressure applied by the bladder assemblies 66a, 66b to the sheath splice fairing 40.

Figure 6:
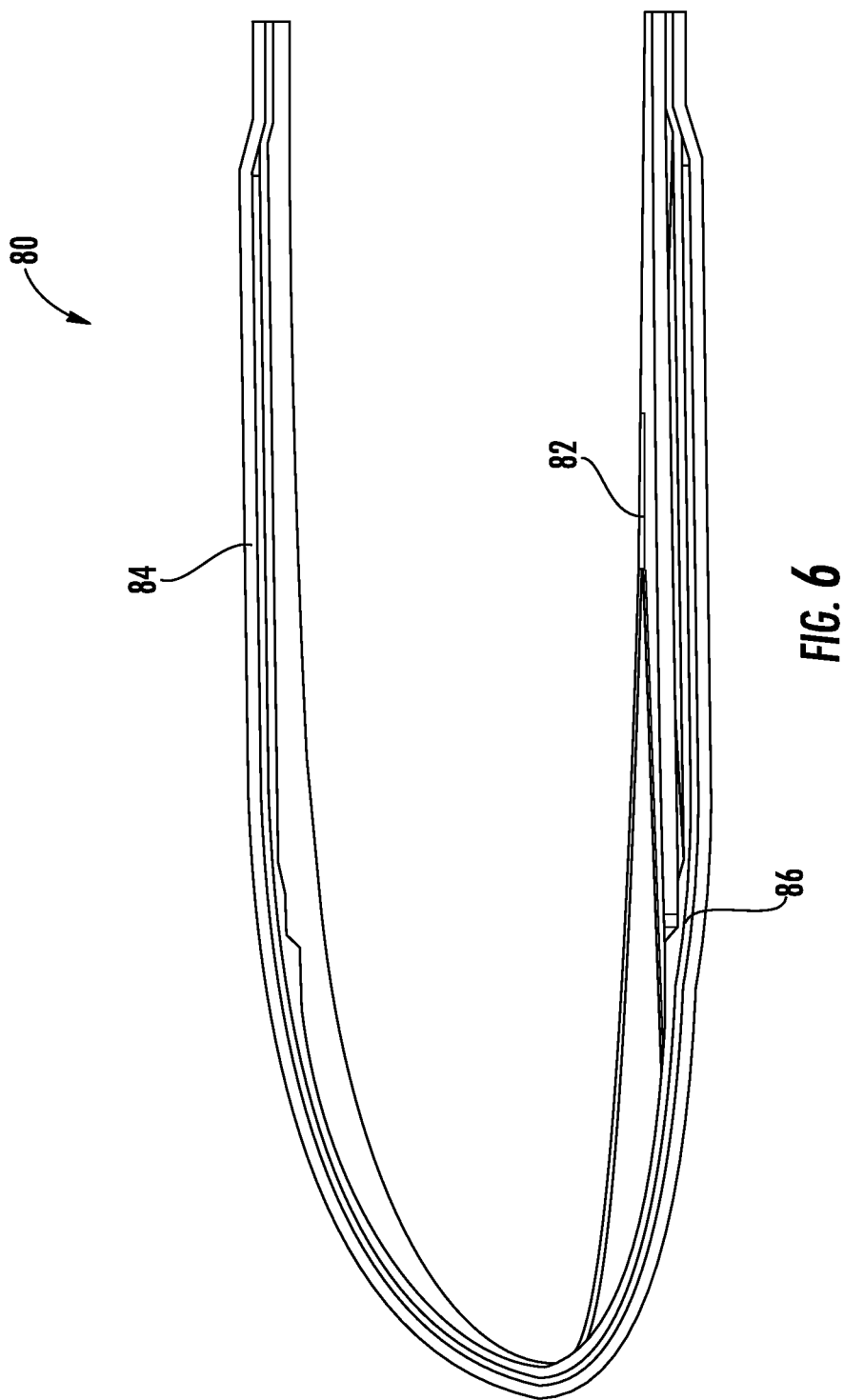
FIG. 6 is a cross-sectional view of a caul assembly associated with the bond fixture according to an embodiment.

A caul assembly 80, best shown in FIG. 6, may be installed around the rotor blade 20 in an overlapping configuration with the sheath splice fairing 40 and the rotor blade 20 prior to installing the bond fixture 50 to the rotor blade 20. The caul assembly 80 includes an inner caul 82 and an outer caul 84. The inner caul 82 has a contour generally complementary to rotor blade 20 at a position aligned with the sheath splice fairing 40 and is arranged in direct contact with the sheath splice fairing 40 and an adjacent surface of the rotor blade 20. The inner caul 82 is configured to conform the sheath splice fairing 40 to a desirable structure. The outer caul 84 has a contour generally complementary to the inner caul 82 and is arranged in an overlapping relationship with the inner caul 82. When the bond fixture 50 is installed about the rotor blade 20, the outer caul 84 is arranged in contact with the bladders 70a, 70b of the first and second bladder assemblies 66a, 66b.

Positioned between the outer caul 84 and the inner caul 82 is a heater blanket 86. As a result of this location, the heater blanket 86 is maintained in a more rigid state. Depending on the construction of the heater blanket 68, the heat generated by the heater blanket 68 may be constant, or may vary across at least one of the span and the chord of the rotor blade 20.

In the non-limiting embodiment illustrated in FIG. 4, the bond fixture 50 includes a trailing edge guard 90 positioned about the trailing edge 34 of the rotor blade 20, generally opposite the frame 52 of the bond fixture 50. The trailing edge guard 90 includes an opening (not shown) generally complementary to the trailing edge 34 of the rotor blade 20 at a position substantially aligned with the sheath splice fairing 40. An interior of the trailing edge guard 90 may include a resilient liner (not shown), such as rubber for example, such that any pressure applied to the rotor blade 20 via the trailing edge guard 90 does not damage the rotor blade 20.

Extending from a portion of the frame 52 is at least one strap 92 configured to restrict movement of the bond fixture 50 relative to the rotor blade 20. The at least one strap 92 may be adjustable, such as via a tensioning knob for example, to tighten and loosen the strap 92 for ease of installation and removal of the bond fixture 50 about the rotor blade 20. In an embodiment, the at least one strap 92 includes a loop connectable at both ends to the frame 52 such that the loop is configured encircle the rotor blade 20. In embodiments where a trailing edge guard 90 is used in conjunction with the bond fixture 50, the loops extend about an exterior of the trailing edge guard 90, and in some instances may be received within a passageway formed in the trailing edge guard 90 to restrict sliding movement of the straps 92.

In another embodiment, the at least one strap 92 is complementary to another component mounted to the rotor blade 20. For example, as shown in FIG. 4, a strap 94 extends from the trailing edge guard 90 corresponding to each strap 92 of the bond fixture 50. The free ends of the fixture straps 92 and the trailing edge guard straps 94 may include complementary portions of a connector 96, such as a hook and D-ring for example, such that corresponding straps 92, 94 may be joined via the connector 96 to restrict movement of both the bond fixture 50 and the trailing edge guard 90 relative to the rotor blade 20.

Figure 7:
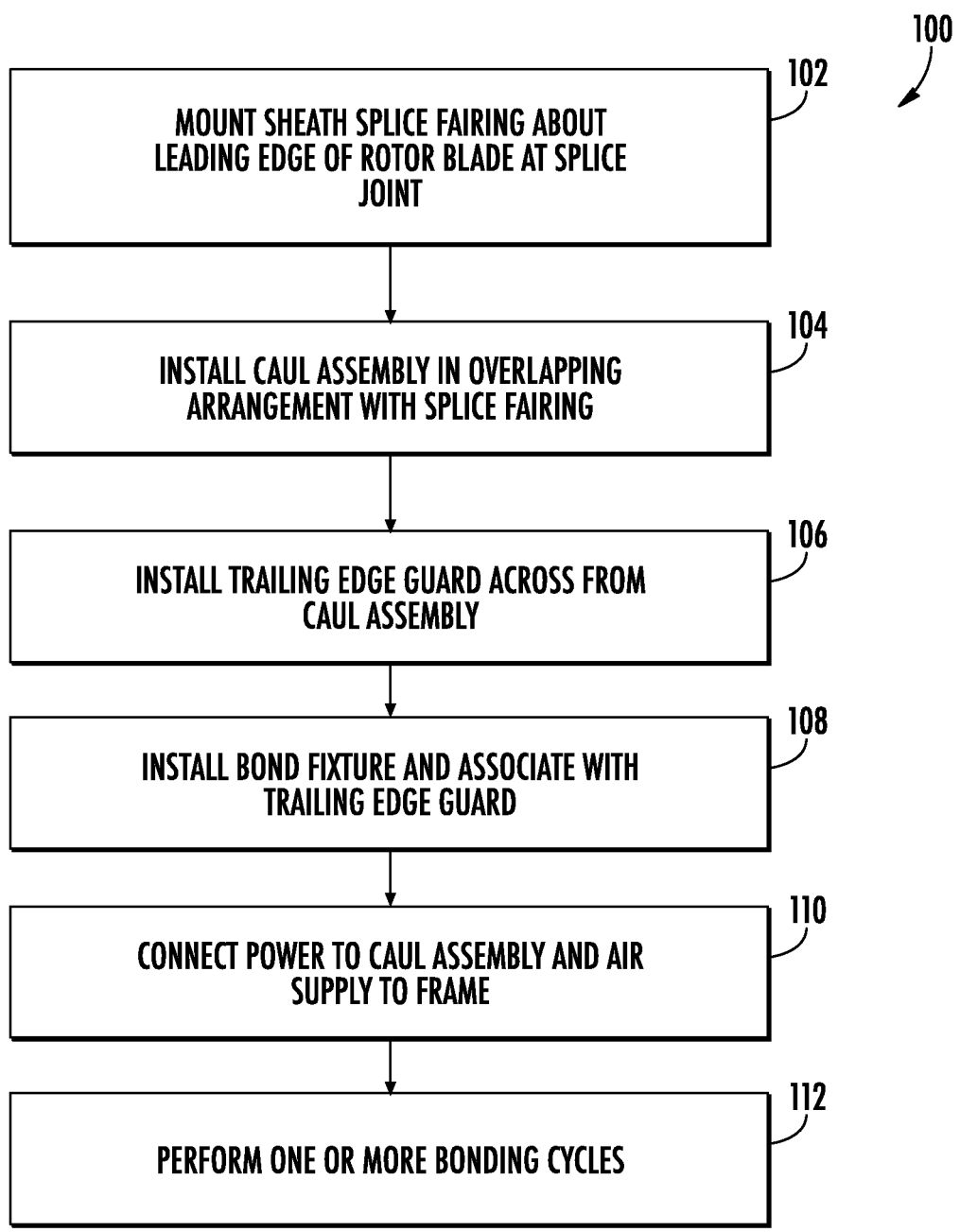
FIG. 7 is a method of using the bond fixture to adhere a sheath splice fairing according to an embodiment.

A method of bonding the sheath splice fairing 40 to the rotor blade 20 is illustrated in FIG. 7. As shown in block 102, the sheath splice fairing 40 is installed about the exterior surface of the rotor blade 20. In an embodiment, installation of the sheath splice fairing 40 may include positioning a layer of release film over the sheath splice fairing 40 and taping the release film in place. The release film may be substantially larger than the size of the sheath splice fairing 40 to provide an adequate area to tape to the rotor blade 20. The caul assembly 80 is then installed over the release film, as shown in block 104. In block 106, a trailing edge guard 90 is mounted about the trailing edge 34 of the rotor blade 20, generally across from the caul assembly 80.

The bond fixture 50 is then mounted about the leading edge 32 of the assembly, as shown in block 108, in an overlapping configuration with the caul assembly 80. In an embodiment, installation of the bond fixture 50 additionally includes securing and/or tightening one or more straps 92 of the bond fixture 50 about the rotor blade 20 to restrict movement of the bond fixture 50 and/or the trailing edge guard 90. In block 110, a power cable assembly and an airline connection are connected to a universal controller. After testing of at least one of the power and a pressure regulator, the universal controller operates the heater and the bladders to simultaneously apply pressure and heat to the sheath splice fairing, as shown in block 112. After one or more bonding cycles are complete, the air is removed from the bladders and the bond fixture is removed from the rotor blade, such as in a reverse order as previously described.

The bond fixture 50 illustrated and described herein provides localized heat and pressure to a desired area of the rotor blade. The small size of the tool allows the bonding process to be performed in a fixed location without requiring movement to a separate location to cure. As a result, the need for a large walk-in oven to cure components of the blade 20 is eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of bonding a sheath splice fairing to a rotor blade comprising:
   installing the sheath splice fairing about the rotor blade;
   mounting a bond fixture to the rotor blade about the sheath splice fairing, the bond fixture comprising (i) at least one bladder assembly operable to apply localized and constant pressure to the sheath splice fairing and (ii) a caul assembly separate from a frame defining a chamber for receiving the rotor blade and from the at least one bladder assembly, the caul assembly being positionable about the rotor blade and receivable adjacent an interior surface of the at least one bladder assembly within the chamber and the caul assembly comprising (a) an inner caul having a contour complementary to the rotor blade and (b) and outer caul having a contour complementary to the inner caul;
   applying pressure to the sheath splice fairing via the bond fixture; and
   applying localized and constant heat to the sheath splice fairing via the bond fixture.

2. The method according to claim 1, further comprising installing the caul assembly about the sheath splice fairing, the caul assembly being received within the bond fixture.

3. The method according to claim 1, wherein mounting the bond fixture to the rotor blade includes tightening at least one strap about the rotor blade.

4. The method according to claim 1, wherein mounting the bond fixture to the rotor blade includes coupling the bond fixture to a trailing edge guard mounted to the rotor blade, opposite the bond fixture.

5. The method according to claim 1, further comprising connecting a power source to the bond fixture to apply heat to the sheath splice fairing.

6. The method according to claim 1, further comprising connecting an air supply to the bond fixture to apply pressure to the sheath splice fairing.

7. The method according to claim 1, wherein the at least one bladder assembly includes a first bladder assembly configured to apply a pressure to a first surface of the rotor blade, and a second bladder assembly configured to apply a pressure to a second surface of the rotor blade.

8. The method according to claim 1, wherein the caul assembly being operable to apply localized and constant heat to the sheath splice fairing.

9. The method according to claim 1, further comprising applying localized heat and pressure to the rotor blade.

10. The method according to claim 1, further comprising applying localized heat and pressure to the rotor blade such that curing occurs in place.

* * * * *